INVENTOR.
MURRAY HEFTER
FRANK J. SCIRE

Jan. 11, 1966   M. HEFTER ETAL   3,229,283
DIRECTION FINDING AND DISTANCE MEASURING SYSTEM
Filed Oct. 27, 1961   4 Sheets-Sheet 3

INVENTOR.
MURRAY HEFTER
FRANK SCIRE

United States Patent Office 3,229,283
Patented Jan. 11, 1966

3,229,283
DIRECTION FINDING AND DISTANCE
MEASURING SYSTEM
Murray Hefter, Far Rockaway, and Frank J. Scire, Brooklyn, N.Y., assignors to Maxson Electronics Corporation, New York, N.Y., a corporation of New York
Filed Oct. 27, 1961, Ser. No. 148,163
13 Claims. (Cl. 343—5)

This invention relates to radiant energy systems. More particularly, this invention relates to a direction finder capable of discriminating between direct and reflected radiant energy in navigational systems, and a distance measuring system adapted to utilize such energy to indicate desired distances.

As is well known, in radar or sonar systems a radiating source can generate directional information when it is isolated. However, if a reflecting surface is in the vicinity of this source, the receiver will receive energy from the direction of the reflecting surface as well as from the radiating source. The receiver, unable to differentiate between these two sources of energy, will therefore generate erroneous information.

Accordingly, it is an object of this invention, to provide a means for discriminating between the direct and reflected energy of a radiant energy source.

It is also an object of the invention to provide a direction finding system in which the operation is not affected by adjacent reflecting surfaces.

It is a further object of the invention to provide a range and/or height finding system utilizing the energy reflected from a surface such as a large body of water.

The manner in which these, and other objects of the invention, are accomplished, will become apparent from the following description and drawings, in which:

FIG. 4c illustrates the manner in which FIGS. 4a and 4b are to be arranged.

Figure 1:
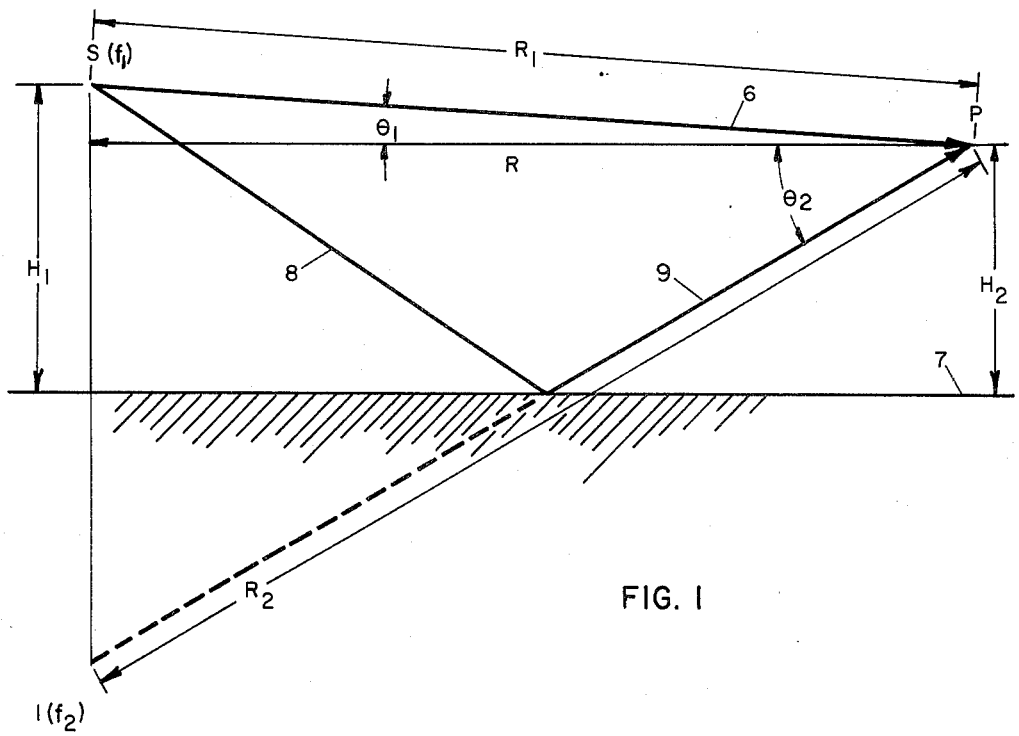
FIG. 1 represents the type of system in which the invention may be employed.

Referring now to FIG. 1, there is shown the type of system in which the invention has particular utility. In the drawing, a radiating source S and a receiver P are shown airborne above a reflecting surface 7 which, for example, may be a large body of water.

The source is at a height $H_1$ above the surface 7, and the receiver at a height $H_2$. The source is radiating energy at a frequency $F_0$, and since there is relative motion between the receiver and the source, the receiver will receive the energy along direct path 6 at a frequency $F_1$, which differs from $F_0$, due to the well known Doppler effect. Because of reflecting surface 7, reflected energy will arrive at the receiver via paths 8 and 9, which energy will appear to be coming from image source I, which is the same distance "below" ground as source S is above the ground level. Since the apparent velocity between the receiver and the image source I will differ from the actual velocity between the receiver and the source S, a second Doppler frequency $F_2$ will be seen by the receiver coming from the reflecting surface 7. If both frequencies $F_1$ and $F_2$ are present in the receiver mixer, the frequencies will heterodyne with each other to produce a third frequency $F_3$.

Figure 2:
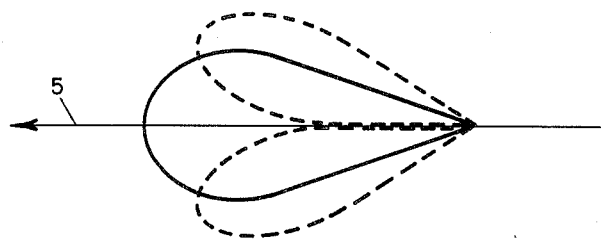
FIG. 2 illustrates the radiation receiving pattern of the invention.

The invention discriminates between the direct and reflected Doppler frequencies by utilizing a receiver having two radiating receiving patterns, as illustrated in FIG. 2. The first pattern is a single lobed pattern in the forward direction 5 as shown by the solid line, whereas the other pattern, shown in dotted lines, is a dual lobed pattern having a null in the forward direction. There are many ways of generating these patterns, one of which will be described later with reference to FIG. 5. For the sake of convenience, direction 5 will hereinafter be referred to as the boresight. When the receiver pattern is positioned so that boresight 5 is directed either at the source S or at the image I, the single lobed pattern will see both energy sources, the frequencies, $F_1$ and $F_2$ will mix, and the receiver will consequently contain beat frequency $F_3$. On the other hand, the double lobed pattern, having a null in the boresight direction, will only see energy from the source which is not in the boresight direction, and, hence, its receiver will see a zero amplitude signal at beat frequency $F_3$. The system thus may be used as a direction finder by rotating the double lobed pattern as is commonly done in monopulse systems by mechanical rotation or by means of electronic phase shifters, in the direction of the reflected waves, until the beat frequency $F_3$ is nulled in amplitude. When this null occurs, the double lobe channel will only be receiving energy from the direct source S. Similarly, when a null is obtained in the double lobe channel from the direction of the direct waves, the receiver is receiving energy only from the direction of image source I.

As the target or the image approaches boresight, the amplitude, not the frequency, of the Doppler beat frequency $F_3$ approaches zero in the double lobed channel. If $R_1$ is the distance between the source and the receiver, and $R_2$ is the distance between the image and the receiver as shown in FIG. 1, a mathematical approximation of the Doppler beat frequency indicates that this frequency is proportional to $dR_{1/dt} - dR_{2/dt}$. Thus, the only time the Doppler beat frequency is zero is when $dR_{1/dt} - dR_{2/dt} = 0$, or when $(R_1 - R_2)$ equals a constant, which is the equation of an infinite family of hyperbolas, with $R_1$ and $R_2$ representing the distances to a point on the curves from the foci. In this case, the foci are the source and the image. Thus, if during an antenna scan operation a signal is present, but no Doppler beat frequencies appear at any time on the single lobed channel output, either no reflections exist or the receiver is on a hyperbolic path. Under the first condition, the system can be instrumented to operate as a conventional monopulse direction finding system with no ambiguities. Under the second condition, the D.C. null will not be stable, and in correcting for the null the moving receiver will leave the hyperbolic path and obtain a Doppler beat frequency, whereby the antenna can search for the direct energy by scanning for the Doppler beat frequency null.

The principles above discussed may be employed in a passive range and height finder. As an example, consider the source of FIG. 1 to be airborne at a height $H_1$ above a reflecting surface such as the ocean. A receiving system may be located at a distance R from the source and at a height $H_2$ above the reflecting surface. There must, of curse, be relative motion between the receiver and the source, so that if the source is radiating energy at a frequency $F_0$, the receiver will see the direct waves at a frequency $F_1$, and the reflected waves at a freqeuncy $F_2$, because of the Doppler effect, as previously explained.

It is desired to find the distances R and $H_1$. From the diagram it can be seen that:

$$H_1 - H_2 = R \tan \theta_1$$
$$H_1 + H_2 = R \tan \theta_2$$

Rewriting the equations:

$$R = \frac{2H_2}{\tan \theta_2 - \tan \theta_1}$$

and $$H_1 = R \tan \theta_1 + H_2$$

Thus, if $H_2$, $\theta_1$, and $\theta_2$ are known, it is possible to determine the desired distances. $H_2$ can easily be determined by means of an altimeter or the like. The method above described can determine the value of the angles $\theta_1$ and $\theta_2$, by positioning the antenna in the vertical plane until the output of the double lobe channel has no beat frequency output, which condition will exist only at positions $\theta_1$ and $\theta_2$. The horizontal axis may then be determined by means of a common gyroscope or its equivalent.

Figure 3:
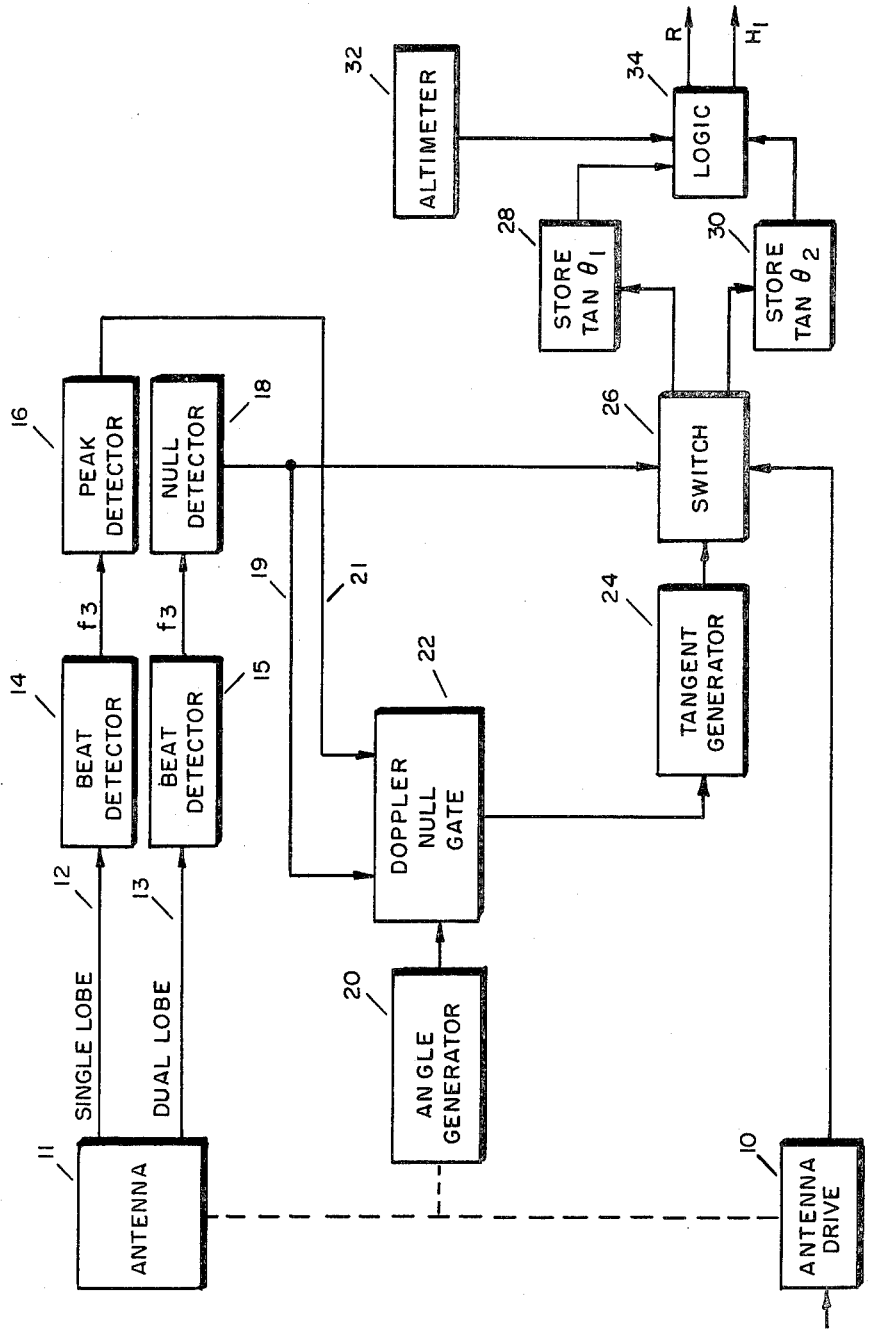
FIG. 3 illustrates a block diagram of a range and/or height finder according to the invention.

In FIG. 3 there is illustrated a block diagram of a system designed to operate as such a range finder. Antenna 11 is driven by Antenna Drive 10 to scan the vertical plane. The outputs 12 and 13 of Antenna 11 are the single and double lobe outputs, respectively. The signals on lines 12 and 13 include $F_1$, $F_2$, and the beat frequency $F_3$. These signals are coupled to respective Beat Detectors 14 and 15, which produce the beat frequencies on their output. The single lobe beat frequency is coupled to Peak Detector 16 while the double beat frequency is coupled to Null Detector 18. Actually both Peak Detector 16 and Null Detector 18 may be identical, and comprise well-known envelope detectors responsive to the relative amplitudes of the beat frequency signals. The nomenclature employed was selected to indicate the conditions upon which the detectors are adapted to enable subsequent circuitry.

Angle Generator 20 is mechanically coupled to Antenna Drive 10 and Antenna 11, so that it can generate a signal indicative of the angular displacement of the antena in the vertical plane. The output of Angle Generator 20 is coupled to Doppler Null Gate 22 whose enabling inputs are connected to Null Detector 18 and Peak Detector 16. Doppler Null Gate 22 provides an output signal indicative of the angular position of Antenna 11 when dual lobe channel 13 indicates a beat frequency null, and single lobe channel 12 indicates a beat frequency peak. This situation as discussed above, only will occur at positions $\theta_1$, and $\theta_2$, or in other words, Doppler Null Gate 22 provides an output indicative of the angular displacement of Antenna 11 when boresight 5 of the antenna receiving pattern is positioned at angle $\theta_1$ or $\theta_2$.

This output is then sent to Tangent Generator 24, whose output is a signal indicative of the tangent of the angle indicative by Doppler Null Gate 22. This signal is then connected through Switch 26 to either Store 28 or Store 30 depending upon the indicated angle. As shown, the position of Switch 26 is determined by Null Detector 18 and Antenna Drive 10, so that after an indication of the tangent has been stored in either Store 28 or Store 30, the switch condition is changed so that the next occurring coincidence is stored in the other store.

The signals stored in Stores 28 and 30, along with a signal from Altimeter 32, indicative of the height of the receiver $H_2$, are then sent to Logic Circuit 34 where they are operated upon to determine the distance R and the height $H_1$.

Figure 4A:
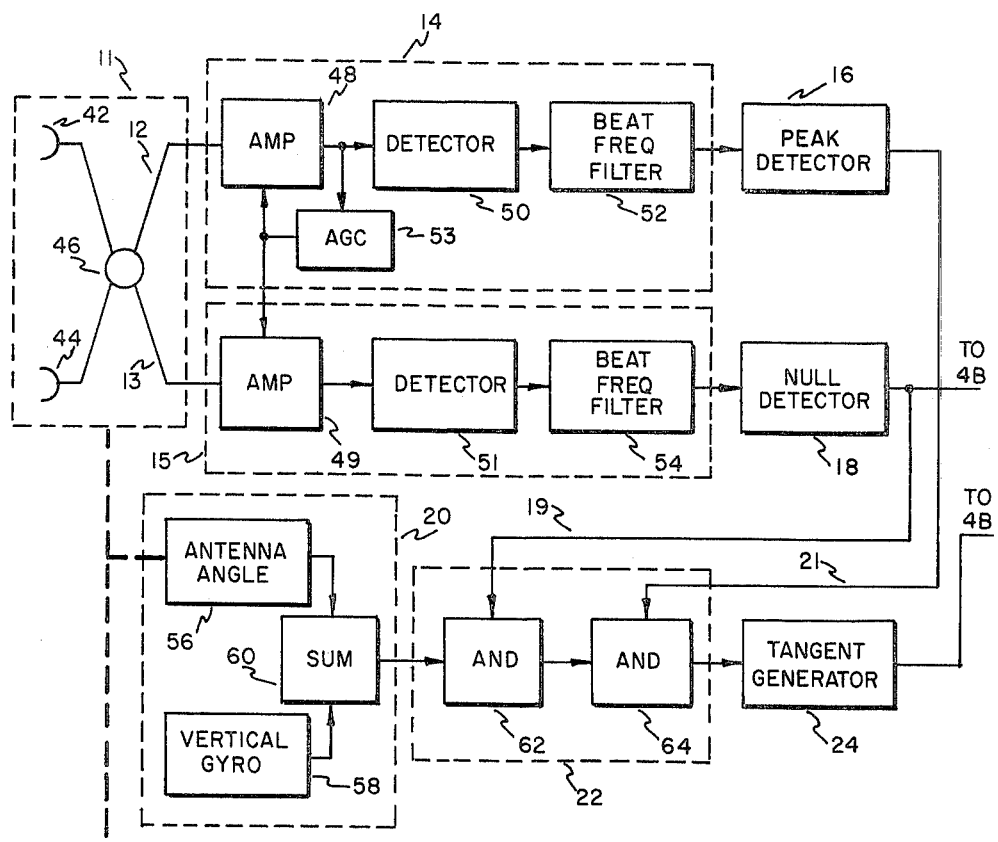
FIGS. 4a and 4b illustrate a more detailed schematic of the block diagram shown in FIG. 3.
Figure 4A:
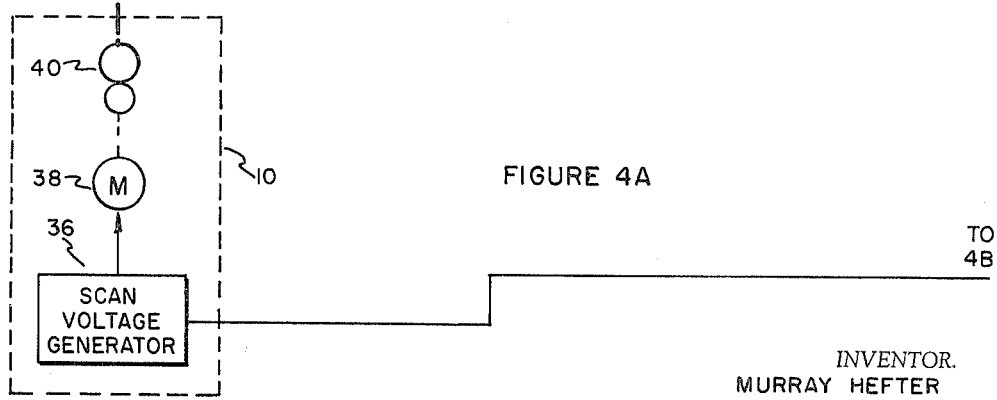
Figure 4B:
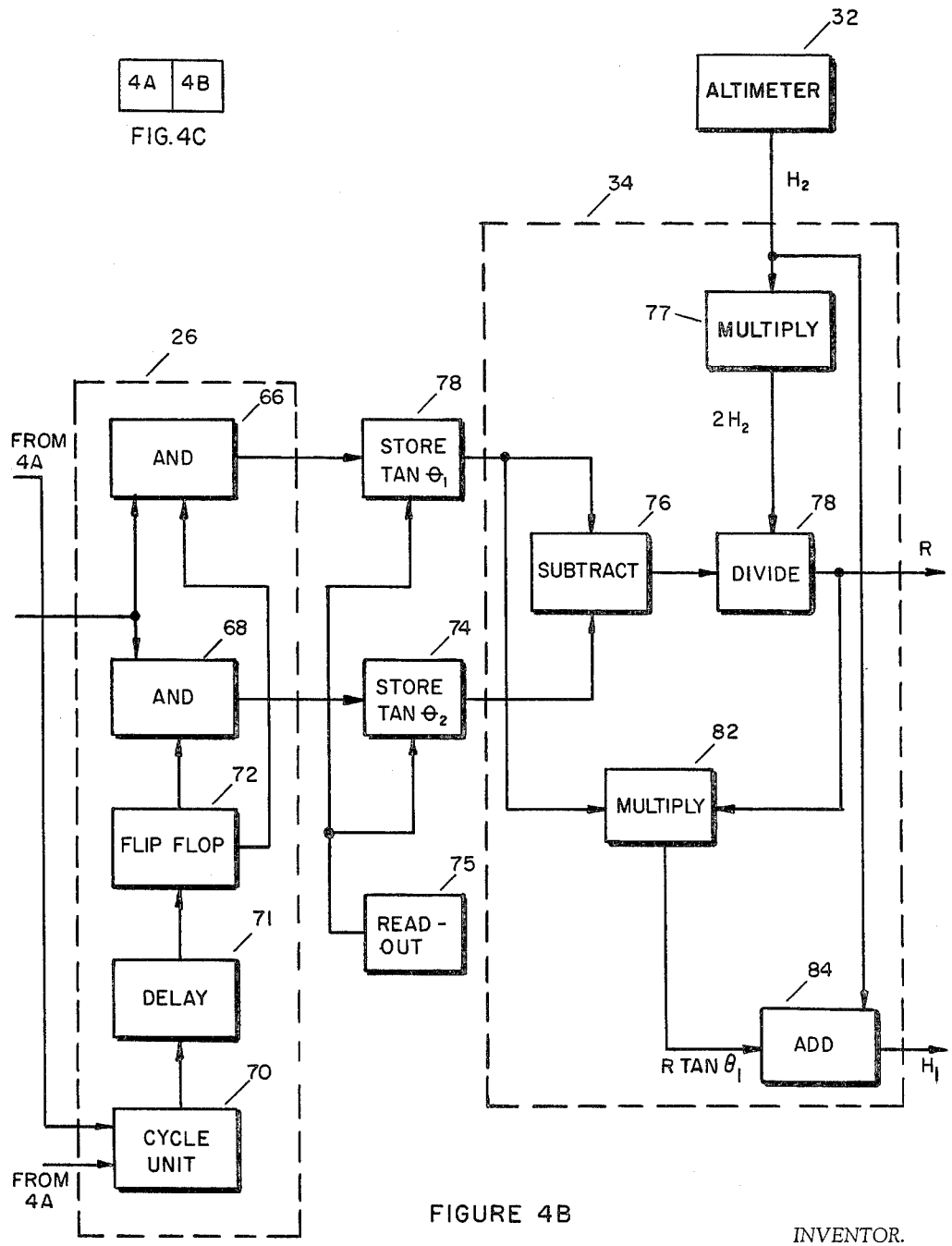

Referring now to FIGS. 4a and 4b, arranged as shown in FIG. 4c, there is illustrated a more detailed diagram of the circuit shown in FIG. 3. Antenna drive 10 consists of Scan Voltage Generator 36, motor 38 and gear train 40. These devices cooperate in a well-known manner to cause Antenna 11 to scan the vertical plane. Antenna 11 may be a well-known antenna of the monopulse type, consisting of antennas 42 and 44, and hybrid 46, connected in such a manner that the outputs 12 and 13, of hybrid 46, represent the signals received by the single lobe and the double lobe radiation patterns, respectively.

The specific means employed to acquire the desired signals on the respective lines does not form a part of this invention. One method for acquiring the desired signals on lines 12 and 13 will be described later with reference to FIGURE 5. Also, it should be noted that it is not necessary to mechanically position the antenna, and if desired, an electronic scanning system, to position the receiving patterns, may be employed within the scope of the invention.

The single lobe signals on channel 12 are amplified by amplifier 48 and then fed to detector 50. Detector 50 may be a common crystal detector whose output is an envelope of the high frequency input voltage. The envelope, of course, will fluctuate at beat frequency $F_3$. Beat frequency filter 52 filters out extraneous noise and high frequency voltages which may be present on the detector output. Beat Detector 15 may be identical to Beat Detector 14, and consists of amplifier 49, detector 51 and beat frequency filter 54, operative in the manner abovedescribed. If desired, automatic gain control 53 may be connected in a feedback loop from amplifier 48 to the inputs of both amplifiers 48 and 49, so that the voltages on the output of these amplifiers will have a proportional relationship to each other. The above components are all conventional in the electronic arts.

The output of beat frequency filter 52 is fed to Peak Detector 16, which is a device that will produce an output when the input voltage exceeds a predetermined level. Similarly, Null Detector 18 is a circuit that produces a voltage when the input level drops below a predetermined value. Many well known circuits will be obvious to one skilled in the art for accomplishing the objectives of detectors 16 and 18.

As Antenna Drive 10 causes Antenna 11 to rotate, Antenna Angle Generator 56, which is mechanically coupled to the antenna, derives a voltage proportional to the angle between the antenna and the airframe axis. Simultaneously, a vertical gyroscope 58 produces a signal indicative of the angle between the airframe axis and the horizontal plane. These two signals may be combined in a summing network 60 to produce a signal indicative of the angle of the antenna relative to ground. Components 56, 58 and 60 are all well-known devices commonly used in range finding devices.

The output signal from summing network 60 is coupled to the input of Doppler Null Gate 22. Gate 22 is normally closed and adapted to be opened by the presence of signals on both enabling inputs 19 and 21. Doppler Null Gate 22 comprises "and" gates 62 and 64, having enabling inputs 19 and 21, respectively. In operation, a signal appears at the input of gate 62 indicative of the angular position of antenna 11. Under normal conditions a null does not exist, and Null Detector 18 fails to enable gate 22. However, once the antenna is positioned at either angular position $\theta_1$ or $\theta_2$, the double lobe pattern will receive a null signal which will cause detector 18 to enable gate 19. Gate 62, accordingly, is opened, and passes a signal indicative of the angular displacement of the antenna to gate 64. If the receiver is properly receiving a transmitter signal, Peak Detector 16, which is responsive to the single lobe receiving pattern, will at all times energize enabling input 21 to maintain gate 64 open. Thus, in the presence of an input signal and a null signal, Doppler Null Gate 22 is opened. Peak Detector 16, in this manner, prevents system operation in the absence of a transmitter signal, since under these conditions Null Detector 18, receiving no signal, would enable gate 62.

When Antenna 11 is positioned at angle $\theta_1$ or $\theta_2$, "and" gates 62 and 64 both open to produce a signal indicative of the angular displacement of the antenna. This signal is coupled to Tangent Generator 24, which produces an output signal indicative of the tangent of the angle represented by the signal at its input. Such a generator is well-known, and may be, for example, a non-linear potentiometer, wound so that the output and input voltages remain in a tangential proportion.

The signal from Tangent Generator 24 is coupled simultaneously to "and" gates 66 and 68 in Switch 26. One of these two "and" gates will be enabled depending upon whether the antenna is scanning for a null in the direction of the direct or reflected waves. A Cycle Unit 70 is responsive to signals from Null Detector 18 and Scan Voltage Generator 36 to produce an output signal each time a new scanning operation is initiated. The output of Cycle Unit 70 is fed through Delay 71, to compensate for inherent delays in the electronic circuitry, to the input of flip-flop 72. The outputs of flip-flop 72 are connected to the enabling inputs of "and" gates 66 and 68, so that one of these gates will be opened and the other closed during each scanning operation. As shown in FIG. 4b, flip-flop 72 is adapted to open "and" gate 66 and close "and" gate 68 when the antenna boresight is searching for the direct waves. When the antenna recycles for another scanning operation, Cycle Unit 70 is operative to flip flip-flop 72 to its second state, whereby "and" gate 66 is closed, and "and" gate 68 opened to permit the system to search for a null in the direction of the reflected waves.

When either "and" gate 66 or "and" gate 68 is opened, the signal appearing on its input is coupled to Store 73 or Store 74, respectively. Stores 73 and 74 may be any well-known storage device depending upon the system requirements, and the type of signals employed. Thus, depending upon the position of the antenna, the presence of a signal, and the existence of a null in the double-lobe channel, a signal is coupled to Store 73 or Store 74, indicative of the tangent of $\theta_1$ or $\theta_2$, respectively. When it is desired to make the range finding calculations a common read-out circuit 75 may be employed to empty the respective storages into Logic Circuit 34.

Logic Circuit 34 also receives an input from Altimeter 32, in a known manner, indicative of the receiver height $H_2$. Multiplier 77 produces a signal twice the value of the signal on its input, or a signal equivalent to $2H_2$. Subtracting circuit 76 subtracts the tangent of $\theta_1$ from the tangent of $\theta_2$, and this difference signal is applied to divider 78, where it is divided by $2H_2$ appearing on a second input. The output from divider 78 is thus equivalent to the distance R as shown above. The divider output R is fed back to multiplier 82 along with a signal indicative of tan $\theta_1$. The product output of multiplier 82, R tan $\theta_1$ is sent to adding circuit 84 along with altimeter output $H_2$ so that the resultant output from adder 84 represents $H_1$. The ouput signals may then be used in any desired manner to indicate the respective distances or to initiate further operations. As will be obvious to one skilled in the art, these logic circuits are old and well-known. Indeed, the circuits shown may be adapted to operate with binary or analog signals, and any type of circuit, which will produce the desired results, may be used within the scope of the invention.

Figure 5:
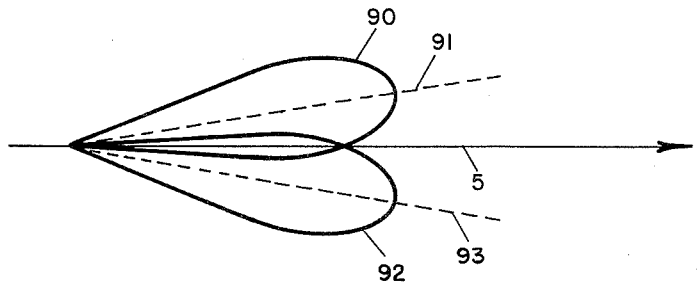
FIG. 5 illustrates a method of achieving the receiving pattern of FIG. 2.

A simple method of acquiring the receiver radiating pattern, illustrated in FIG. 2, will now be described with reference to FIG. 5. FIG. 5 illustrates the receiving pattern of a conventional monopulse antenna. The pattern consists of a first lobe 90 extending in direction 91, and a second lobe 92 extending in direction 93. The axis of the pattern is in the direction 5, which is the boresight of the antenna pattern of FIG. 2.

By utilizing a common hybrid, shown as 46 in FIG. 4a, it is possible to employ two separate channels; the first representing the sum of the signals received by lobes 90 and 92, and the second representing the difference between the signals received by lobes 90 and 92. If the signals from lobes 90 and 92 are added together, the resultant signals will be equivalent to those that would be received by a single lobe pattern having a maximum field strength along boresight 11, or one corresponding to the single lobe pattern of FIG. 2. On the other hand, if the signals from one of the two lobes 90 or 92 are subtracted from the signals from the other, the resultant signals will be equivalent to those that would be received by a double lobe pattern having a null in the direction of boresight 11, or one corresponding to the double lobe pattern of FIG. 2. Accordingly, the sum and difference outputs of hybrid 46 are equivalent to the signals received by the separate receiving patterns of FIG. 2.

It would also be possible to utilize the invention in a closed loop tracking system. When reflections exist, and neither the image nor the source are at boresight, Doppler beat frequencies will exist in both of the two antenna channels. For instance, when both the direct and reflected waves are below boresight, the Doppler beat frequencies from the two channels are both in phase. If the antenna boresight is between the source and the image, the Doppler beat frequencies will be 180° out of phase. When both direct and reflected waves are above boresight, the Doppler beat frequencies are again in phase. This phase relationship may then be utilized to distinguish between image and source by recording the phase information as a D.C. voltage in synchronization with the antenna scan.

Thus, although a specific embodiment of the invention has been disclosed, many modifications thereof will be obvious to one skilled in the art. It is therefore not my intention to be limited, except as defined in the following claims.

We claim:

1. For use in a radiant energy system wherein the transmitted energy may be subjected to reflecting surfaces, a receiver adapted to discriminate between the direct and reflected waves, said receiver including antenna means having two radiation receiving patterns, the first of said patterns comprising a main lobe with an axis extending in one direction and said second pattern having two lobes with a null therebetween in said direction, positioning means responsive to the maximum amplitude of the reflected signals received by said second pattern so that said null extends in the direction of maximum amplitude of the reflected waves, whereby only one of said lobes of said second pattern will receive said direct waves.

2. For use in a radiant energy system wherein the transmitted energy may be subjected to reflecting surfaces, a receiver adapted to discriminate between the direct and reflected waves, said receiver including antenna means having a radiation pattern with a null in one direction, means for heterodyning the direct and reflected Doppler frequency waves detected by said antenna, means for indicating the minimum amplitude of the heterodyned wave, and means for positioning said pattern so that said null extends toward said reflected wave, said positioning means being connected to said measuring means whereby the desired pattern position is determined when said measuring means indicates the minimum amplitude of said heterodyned wave.

3. For use in a radiant energy system wherein the transmitted energy may be subjected to reflecting surfaces, a receiver adapted to discriminate between the direct and reflected waves, said receiver including antenna means having a radiation receiving pattern with a null in one direction, means for heterodyning the direct and reflected doppler frequency waves detected by said antenna, means for measuring the amplitude of the heterodyned wave, means for positioning said pattern, and means for indicating the position of said pattern when said measuring means indicates a null amplitude of said heterodyned wave.

4. For use in a radiant energy system wherein the transmitted energy may be subjected to reflecting surfaces, a receiver adapted to discriminate between the direct and reflected waves, said receiver including antenna means having a radiation receiving pattern with a null in one direction, means for indicating the presence of an incoming signal, means for heterodyning the direct and reflected doppler frequency waves received by said pattern, means for measuring the amplitude of the heterodyned wave, means for positioning said pattern, and means responsive to said indicating means and said measuring means for indicating the position of said pattern when said measuring means signals the occurrence of a minimum amplitude of said heterodyned wave in the presence of an incoming signal.

5. For use in a radiant energy system wherein the transmitted energy may be subjected to reflecting surfaces, a receiver adapted to discriminate between the direct and reflected waves, said receiver including antenna means having two radiation patterns, the first of said patterns having a lobe extending in one direction and the second having two lobes with a null therebetween in said direction, a first detector for signalling the reception of a signal by said first pattern, means for heterodyning the direct and reflected doppler frequency waves received by said second pattern, a second detector connected to the output of said heterodyning means for signalling the occurrence of a minimum amplitude of the heterodyned signal, and means for positioning said patterns so that said null extends in the direction of one of said waves, said positioning means being responsive to the outputs of said first and second detectors.

6. For use in a radiant energy system wherein the transmitted energy may be subjected to reflecting surfaces, a receiver adapted to discriminate between the direct and reflected waves, said receiver including antenna means having two radiation patterns, the first of said patterns having a lobe extending in one direction and the second having two lobes with a null therebetween in said direction, a first detector for signalling the reception of a signal by said first pattern, means for heterodyning the direct and reflected doppler frequency waves received by said second pattern, a second detector connected to the output of said heterodyning means for signalling the occurrence of minimum amplitude of the heterodyned wave, means for positioning said patterns, and means responsive to the outputs of said first and second detectors for indicating the angular position of said antenna means.

7. A receiver for discriminating between first and second different frequency waves, said receiver having antenna means, said antenna means being characterized by two radiation receiving patterns, the first pattern extending in a given direction and the second pattern having a null in said direction, means for directionally adjusting said second pattern, means for detecting the doppler beat frequency signals produced by said first and second high frequency waves for both of said radiation patterns, and means for indicating the relative position of said second pattern when the beat frequency signal of said second pattern is at a minimum level.

8. A receiver for discriminating between first and second different frequency waves, said receiver having antenna means, said antenna means being characterized by two radiation patterns, the first pattern extending in a given direction and the second pattern having a null in said direction, means for adjusting said patterns, means for detecting the beat frequency signals produced by said first and second high frequency waves for said second radiation patterns, and means for indicating the relative position of said antenna when the beat frequency signal of said second pattern is at a minimum level and said first pattern receives a signal above a predetermined value.

9. A receiver for a range finding system wherein it is desired to indicate specific distances and wherein there is provided a first source of radiant energy at a frequency $F_1$ and a second source of radiant energy at a frequency $F_2$ positioned away from said first source, comprising antenna means having a radiation receiving pattern with a null extending in a signal direction, means for heterodyning the signals received by said pattern, means for positioning said pattern whereby to vary the amplitude of the heterodyned signals, means for generating a signal indicative of the position of said pattern relative to a reference in space, and means responsive to said heterodyned signals and said last named signal for indicating the direction of said null.

10. A receiver for a range finding system wherein it is desired to indicate specific distances and wherein there is provided a first source of radiant energy at a frequency $F_1$ and a second source of radiant energy at a frequency $F_2$ positioned away from said first source, comprising antenna means having a radiation receiving pattern with a null extending in a given direction, means for heterodyning the signals received by said antenna means, means for detecting the minimum amplitude of the heterodyned signals, means for rotating said pattern, means for generating a signal indicative of the angular displacement of said pattern, means operative in response to said detecting means for storing said last named signals, and logical circuit means for performing mathematical operations on said stored signals to indicate said distances.

11. A receiver for a range finding system wherein it is desired to indicate specific distances and wherein there is provided a first source of radiant energy at a frequency $F_1$ and a second source of radiant energy at a frequency $F_2$ positioned away from said first source, comprising antenna means having a radiation receiving pattern with a null extending in a given direction, means for heterodyning the signals received by said antenna means, means for detecting the minimum amplitude of the heterodyned signals, means for rotating said pattern, means for detecting the presence of an incoming signal, means for generating a signal indicative of a trigonometric function of the angular displacement of said pattern, means operative in response to said detecting means for storing said last named signals, and logical circuit means for performing mathematical operations on said stored signals to indicate said distances.

12. A receiver for a range finding system wherein it is desired to indicate specific distances and wherein there is provided a first source of radiant energy at a frequency $F_1$ and a second source of radiant energy at a frequency $F_2$ positioned away from said first source, comprising antenna means having two radiation receiving patterns, the first being a single lobe extending in one direction and the second being double lobe having a null in said direction, first and second channels connected to said antenna means and responsive to the signals received by said first and second patterns, respectively, each of said channels including means for heterodyning the signals received by its corresponding pattern and detecting means connected to said mixing means for detecting the envelope of the mixed signal, means for rotating said patterns, angle generator means for generating a signal indicative of the angular displacement of said pattern, gating means connected to said angle generating means, said gating means having enabling inputs connected to each of said detecting means whereby said gating means is open when the detector of said first channel detects an incoming signal and the detector of said second channel detects a minimum signal, means connected to said gating means for generating signals trigonometrically proportional to said angular displacement whenever said gating means is open, storage means for storing said signals, and a logic circuit connected to said storage means for operating on the signals stored therein to indicate said desired distances.

13. A receiver for a doppler range finding system wherein it is resired to indicate specific distances and wherein there is provided a first source of radiant energy at a frequency $F_1$ and a second source of radiant energy at a frequency $F_2$ positioned away from said first source, and wherein the transmitted energy is subjected to reflecting surfaces, said receiver comprising antenna means having two radiation receiving patterns, the first being a single lobe extending in one direction and the second being a double lobe having a null in said direction, first and second channels connected to said antenna means and responsive to the signals received by said first and second patterns, respectively, each of said channels including means for mixing the signals received by its corresponding pattern and detecting means connected to said mixing means for detecting the envelope of the mixed signal, means for positioning said antenna, angle generator means for generating a signal indicative of the angular displacement of said antenna means, gating means connected to said angle generating means, said gating means having enabling inputs connected to each of said detecting means whereby said gating means is open when the detector of said first channel detects a signal and the detector of said second channel detects a null signal, means connected to said gating means for generating signals trigonometrically proportional to said angular displacement whenever said gating means is open, storage means for storing said signals, and a logic circuit connected to said storage means for operating on the signals stored therein to indicate said desired distances.

References Cited by the Examiner

UNITED STATES PATENTS

| | | | |
|---|---|---|---|
| 2,134,535 | 10/1938 | Runge | 343—12 |
| 2,825,900 | 3/1958 | Collbohm | 343—100 |
| 2,837,738 | 6/1958 | Van Valkenburgh | 343—12 |
| 2,972,142 | 2/1961 | Parkinson | 343—8 |

CHESTER L. JUSTUS, *Primary Examiner.*